United States Patent [19]
Richard

[11] 4,085,613
[45] Apr. 25, 1978

[54] THERMAL ENERGY FLOWMETER

[76] Inventor: Joseph D. Richard, 3613 Loquat Ave., Miami, Fla. 33133

[21] Appl. No.: 774,932

[22] Filed: Mar. 7, 1977

[51] Int. Cl.² .................................... G01K 17/08
[52] U.S. Cl. ........................................... 73/193 R
[58] Field of Search ............... 73/190 R, 193 R, 204

[56] References Cited

U.S. PATENT DOCUMENTS

| | | | |
|---|---|---|---|
| 2,633,747 | 4/1953 | Lindstrom | 73/193 |
| 2,633,749 | 4/1953 | Lindstrom | 73/193 |
| 2,931,222 | 4/1960 | Noldye et al. | 73/193 |
| 3,167,957 | 2/1965 | Ziviani | 73/193 |
| 3,233,458 | 2/1966 | Vrolyk | 73/190 |
| 3,267,726 | 8/1966 | Sellers, Jr. | 73/190 |

Primary Examiner—Herbert Goldstein

[57] ABSTRACT

A method and apparatus for measuring the rate of flow and the totalized quantity of thermal energy flowing through a conduit. A small proportion of the thermal energy flowing through a conduit is by-passed to a heat exchanger, which is otherwise isolated from the thermal energy in the conduit, and shunted to a heat sink maintained at a reference temperature. The temperature differential along the heat shunt is measured as an indication of the total heat flow through the conduit.

10 Claims, 3 Drawing Figures

THERMAL ENERGY FLOWMETER

BACKGROUND OF THE INVENTION

In the past, a variety of methods have been used to measure the thermal energy content of a fluid flowing through a conduit. Methods used in the past have involved the separate sensing of flow rate and temperature (relative to some reference such as ambient temperature) and, from these two independently measured variables, computing the thermal energy flow. Generally, the thermal unit used in the past has been the British thermal unit (Btu) which in practical use is defined as the amount of heat required to raise one pound of water one degree Farenheit.

SUMMARY OF THE INVENTION

The present invention provides a method and means for measureing the rate of flow and/or the totalized quantity of thermal energy flowing through a conduit. The measurement depends directly on the variations in heat flow only so that separate volume flow rate and temperature sensors are not needed. Although suited for other fluids, including gases, and for various types of heating or cooling systems, for purposes of illustration, the present invention is described herein as used in conjunction with a water heating system. The thermal energy flowmeter is particularly adapted for measuring the amount of thermal energy added or removed from a fluid by a heating or cooling system relative to the temperature of the intake fluid supply. For example, the thermal energy flowmeter is suitable for measuring the Btu content of water flowing from a water heater relative to the water supply entering the water heater, so that the Btu output of the heater can be measured. One such use would be to meter the total Btu output of a solar water heater. Another such use would be to individually meter the Btu usage of each of a number of outlets, such as in an apartment building, from a large water heating system. In one preferred embodiment of the invention, a thermal energy flowmeter is provided which measures the Btu flow rate and/or the totalized Btu count without the need for an external power source to energize the measuring system. In this preferred embodiment, a small fractional part of the heat flow is converted to electrical energy and used to power the flow rate or totalizing indicators.

In the present invention, heated water (e.g. from a water heater) is piped into a first conduit having a constriction. In accord with the well known principles of orifice flow metering, a pressure differential occurs across the construction which is proportional to the volume flow rate. A by-pass tube of relatively smaller diameter connects the high and low pressure sections of the conduit so that flow occurs within the by-pass at a rate proportional to the pressure difference and therefore to the flow rate through the conduit. A heat exchanger is interposed in the by-pass and an elongated thermal shunt, having a relatively high thermal conductivity, is thermally coupled to the heat exchanger at one end and to a second conduit at the other end. The second conduit contains water being supplied to the aforementioned water heater and thus serves as a heat sink to which one end of the elongated thermal shunt is coupled. Means are included for measuring the temperature differential along a section of the thermal shunt. It can be readily seen that the temperature differential along the thermal shunt is proportional to the rate at which heat is supplied to the heat exchanger. It can also be seen that the rate that heat is supplied to the heat exchanger depends on the rate of flow of heated water in the bypass and on the temperature of the heated water relative to the water supply. Thus the temperature differential along a section of the thermal shunt is proportional to the heat flow rate through the by-pass, and therefore proportional to the heat flow rate through the first conduit. Because the heat flow rate theough the by-pass is a product of the volume flow rate and the temperature above reference, if either quantity is zero then no heat is supplied to the heat exchanger and no temperature differential occurs along the thermal shunt. Thus the present invention provides a thermal energy flowmeter insensitive to either stagnant hot water or to fast flowing water remaining at the same temperature as the water supply.

DESCRIPTION OF THE PREFERRED EMBODIMENTS

Figure 1:
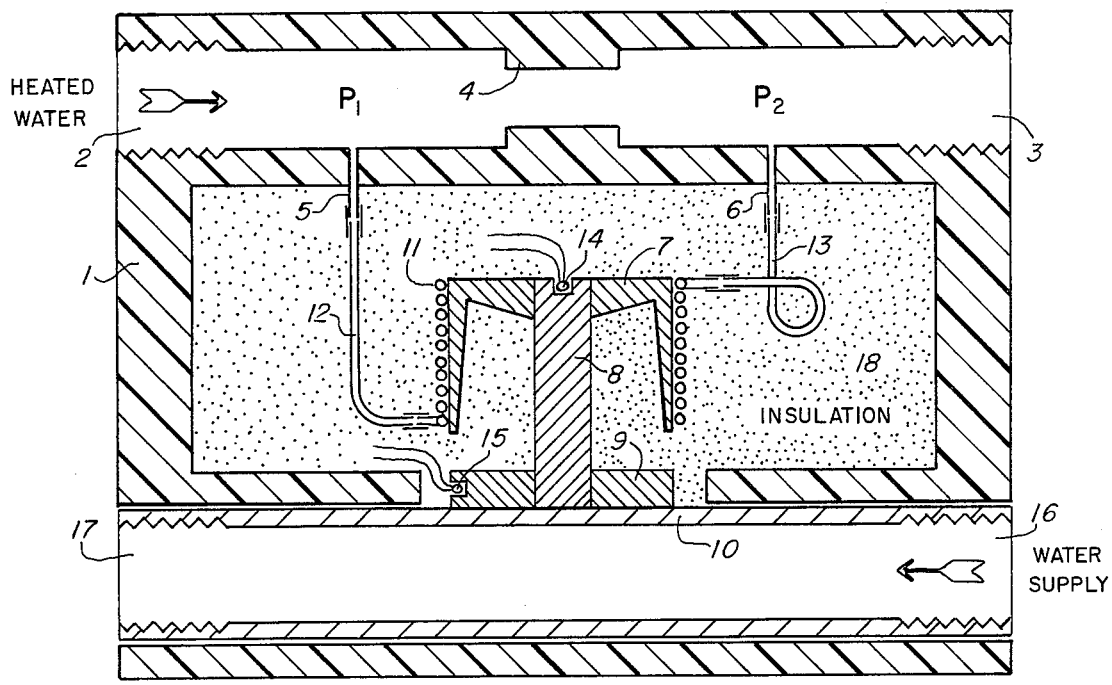
FIG. 1 is a section view of the fluid conveyance portion of the thermal energy flowmeter.

In FIG. 1, a housing 1 is shown through which passes first and second conduits. The first conduit includes an entry port 2 and exit port 3 and a centrally located constriction 4. The second conduit, having a thermally conductive wall 10, includes an entry port 16 and an exit port 17. In response to fluid flow through the first conduit, a pressure differential $P_1 - P_2$ occurs across the constriction 4 in accordance with well known orifice flow metering principles. A heat exchanger comprising highly conductive tubing 11 would around a highly conductive cylindrical mandrel 7 is positioned within the housing 1. The cylindrical mandrel 7 is thermally coupled to the first end of a thermal shunt 8, and the second end of the thermal shunt 8 is thermally coupled to the heat sink 9. The heat sink 9 is thermally coupled to the conductive wall 10 of the second conduit so that the second end of the thermal shunt 8 is maintained at essentially the same temperature as fluid within the second conduit. The input end of the heat exchanger tubing 11 is connected to the high pressure section of the first conduit by means of a first connector tube 12 and the access fitting 5. The output end of the heat exchanger tubing 11 is connected to the low pressure section of the said first conduit by means of a second connector tube 13 and the access fitting 6. The heat exchanger 7 and 11, the heat shunt 8, and the heat sink 9 and 10 are thermally isolated from the fluid within the first conduit by means of insulation 18. Heat transfer to the heat exchanger 7 and 11 is therefore dependent on the temperature and flow rate of fluid within the small diameter by-pass tubing system 5, 12, 11, 13, and 6. Flow rate through the by-pass is dependent on the pressure drop $(P_1 - P_2)$ across the constriction 4 and therefore is proportional to the fluid flow rate through the first conduit. It can be readily seen therefore that the rate of heat transfer to the heat exchanger 7 and 11 is dependent on the rate of flow of heat through the first conduit, with the heat flow (i.e., for water) defined as the product of fluid volume flow rate and temperature relative to the heat sink temperature of the fluid in the second conduit. The temperature differential along a section of the thermal shunt 8 is proportional to the rate of heat transfer to the heat exchanger 7 and 11. This temperature differential is measured by means of thermistors 14 and 15.

Figure 2:
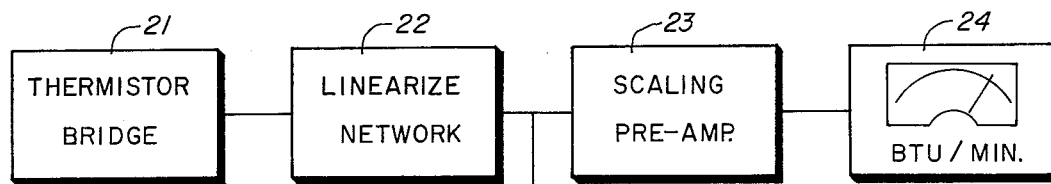
FIG. 2 is a block diagram of the temperature differential measuring and integrating components of the thermal energy flowmeter.

FIG. 2 shows schematically one preferred method for measuring the flow rate and the integrated value of the thermal energy flow through the first conduit shown in FIG. 1. A thermistor bridge 21, including thermistors 14 and 15, is shown for measuring the temperature differential along the thermal shunt 8. The output of the thermistor bridge 21 is linearized by the network 22 and amplified by the scaling pre-amplifier 23 to match the calibrated scale on the meter 24. The meter 24 is calibrated to indicate the rate of flow of thermal energy, for example in units of Btu/minute, flowing through the first conduit shown in FIG. 1. A second scaling pre-amplifier 25 adjusts the linearized output from the network 22 so that the frequency output from the voltage to frequency converter 26 corresponds numerically to the thermal energy flow rate through the first conduit of FIG. 1. Since the full scale output of the voltage to frequency converter 26 is typically 10,000 Hz, a frequency divider 27 reduces the output pulse rate so that, for example, one pulse is fed to the relay driver 28 for each Btu flowing through the first conduit. The output of the relay driver 28 drives the electromechanical counter 29 which thereby counts the accumulated Btu flow through the first conduit. Alternatively, depending on the frequency divider 27, units of 0.1 or 10 Btu per count could similarly be accumulated and displayed by the counter 29.

Figure 3:
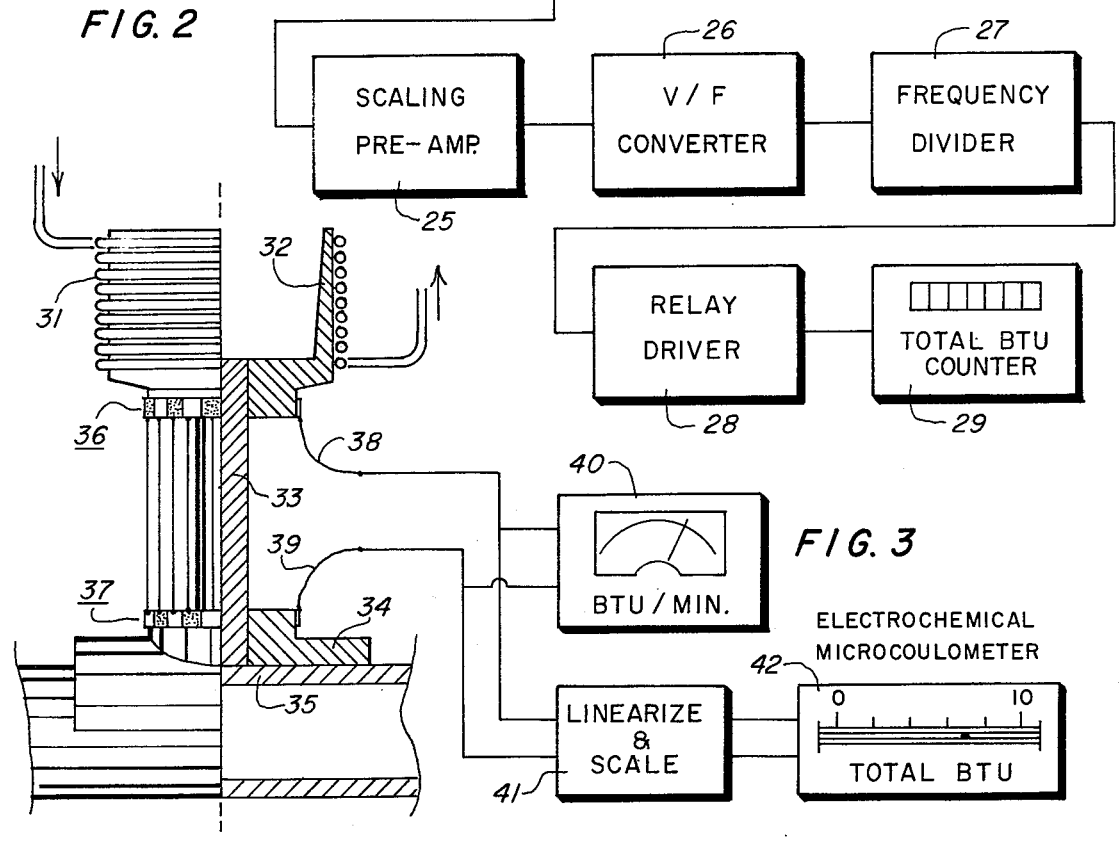
FIG. 3 is a partly sectional and schematic view of one preferred embodiment of the thermal energy flowmeter in which a fractional part of the thermal energy is used to power the thermal energy flow indicators.

FIG. 3 shows the heat exchanger and thermal shunt portions of a thermal energy flowmeter similar to FIG. 1 except that a thermopile 36 and 37 is used to measure the temperature differential across the thermal shunt 33. Thus the thermal energy flowmeter of FIG. 3 is powered by the conversion of a fractional part of the thermal energy flowing through the heat exchanger to electrical energy which in turn powers the meter 40 and the electrochemical microcoulometer 42. As in FIG. 1, the highly conductive tubing 31 wound around the highly conductive mandrel 32 comprises a heat exchanger thermally coupled to the first end of the thermal shunt 33. The second end of the thermal shunt 33 is thermally coupled to the heat sink 34 and the conductive wall 35 of the conduit containing the reference temperature fluid supply. A plurality of thermocouples 36 are thermally coupled to the first end of the thermal shunt 33 and a second plurality of thermocouples 37 are thermally coupled to the second end of the thermal shunt 33. Dissimilar junctions from the two groups of thermocouples 36 and 37 are connected in series thus comprising a conventional thermopile pair arranged to measure the temperature differential along the thermal shunt 33 relative to the heat sink 34-35 temperature as determined by the fluid temperature within the supply conduit. The output potential from the thermopile pair 36-37 is connected to the millivolt meter 40 and the linearizing and scaling network 41 by means of the connecting wires 38 and 39. The meter 40 can be calibrated and scaled to indicate the Btu flow rate through a conduit (such as shown in FIG. 1) by indicating the temperature difference along the thermal shunt 33, which in turn is proportional to the rate of heat delivery to the heat exchanger 31-32. The integrated value of the electric current from the thermopile pair is indicated by the electrochemical microcoulometer which thus indicates the totalized Btu flow through the conduit containing heated fluid (relative to the heat sink 34-35 temperature).

The electrochemical microcoulometer 42 shown in FIG. 3 is a commercially available device comprising essentially a glass capillary tube containing a mercury column. The mercury column is broken by a small gap filled with an electrolyte. Electrodes at each end of the mercury column allow electric current to be passed through the device. Mercury is transferred electrochemically across the gap at a rate proportional to the current. Therefore, the displacement of the gap along an adjacent calibrated scale provides a measure of the current-time integral.

A method and apparatus has been described for measuring thermal flow in a conduit relative to a reference temperature. Unlike thermal energy flowmeters used in the past, separate flow rate and temperature sensors are not required. Typically, the thermal energy flowmeter described herein is used to measure the thermal energy added or removed from a water supply and the reference temperature is the initial temperature of the water supply. Obviously, there are many possible variations in the construction and operation of the thermal energy flowmeter. Although heated water is described as an example, the thermal content of other fluids can also be measured using this method. Since the apparatus measures thermal flow directly, it is relatively insensitive to differences in specific heat of the fluid. Because the apparatus is sensitive only to thermal flow relative to a reference fluid supply temperature, it can be used in a recirculating system wherein, under low demand situations, the water in both conduits can be of almost equal temperature (however high or low) and yet only the actual difference in thermal units is measured — e.g. thermal units added or removed from the reference water supply.

For many applications it is convenient to use a supply fluid within a second conduit to establish the reference or heat sink temperature. However, as an alternative, the reference temperature to which the heat shunt is coupled can be a heat sink maintained at ambient air temperature or any other reference temperature. Generally, copper or silver are suitable materials for the heat exchanger and heat shunt. However, a less conductive metal could be used for the heat shunt when only low ranges of heat flow are to be measured. The tubing of the heat exchanger can be silver soldered to the cylindrical mandrel to facilitate the heat transfer.

Obviously, many alternative constructions could be suggested for the heat exchanger, and the configurations shown in FIGS. 1 and 3 are merely illustrative. Only two examples are shown in the Figures for integrating, with respect to time, the electrical output signal indicative of heat flow rate to effect a measure of the totalized heat flow. Obviously many alternative integrating methods would also be suitable. For example, an electrical output signal could be generated proportional to heat flow rate, and the electrical signal could be fed into a conventional watt-hour meter to totalize the heat flow.

At very high temperatures and flow rates through the conduit shown in FIG. 1, the heat exchanger efficiency may become inadequate to transfer enough heat to the shunt to maintain an output signal proportional to heat flow. As an alternative, therefore, a compensation signal can be derived by separately measuring the temperature differential of the by-passed fluid entering and leaving the heat exchanger. Overloading of the heat exchanger results in a corresponding decrease in the differential temperature across the heat exchanger relative to the differential temperature along the heat shunt.

While only certain preferred embodiments are shown and described herein, it is understood that many modifications are possible and the invention is not limited to the specific structure disclosed, nor otherwise, except as set forth in the following claims.

What is claimed is:

1. Apparatus for measuring heat conveyed by a flowing fluid comprising:
   a conduit adapted to receive a flowing fluid;
   a constriction within said conduit for providing differential pressure proportional to the rate of fluid flow;
   a by-pass tube connected across the said constriction through which some of the aforementioned fluid flows at a rate proportional to the differential pressure;
   a thermal shunt having first and second ends and a relatively high thermal conductivity;
   a heat exchanger for facilitating the transfer of heat between fluid flowing within the said by-pass tube and the first end of the said thermal shunt, the said heat exchanger and thermal shunt being otherwise thermally isolated from the fluid within the said conduit;
   a heat sink for maintaining the second end of the said thermal shunt at a reference temperature; means for measuring the temperature differential across at least a portion of the said thermal shunt; and
   means for indicating the heat flow through the said conduit as a function of the said measured temperature differential.

2. Apparatus as described in claim 1 wherein the said means for measuring the temperature differential across at least a portion of the said thermal shunt provides an electrical output signal proportional to the heat flow rate through the said conduit; and,
   the said means for indicating the heat flow through the said conduit includes means for integrating the said electrical output signal with respect to time as a measure of the totalized heat flow through the said conduit.

3. Apparatus as described in claim 1 wherein said means for measuring the temperature differential across at least a portion of the said thermal shunt includes a plurality of thermocouples; and,
   the said means for indicating the heat flow through the said conduit includes a meter for measuring the electrical output of the said thermocouples, said meter being calibrated in terms of heat flow rate through the said conduit.

4. Apparatus as described in claim 1 wherein said means for measuring the temperature differential across at least a portion of the said thermal shunt includes a plurality of thermocouples; and
   the said means for indicating the heat flow through the said conduit comprises an electrochemical coulometer for integrating with respect to time the output of the said thermocouples, said coulometer being calibrated in terms of totalized heat flow through the said conduit.

5. Apparatus as described in claim 1 wherein said means for measuring the temperature differential across at least a portion of the said thermal shunt includes a voltage to frequency converter; and,
   said means for indicating the heat flow through the said conduit includes a counter for integrating the output of the said voltage to frequency converter, said counter being calibrated in terms of totalized heat flow through the said conduit.

6. Thermal energy flow measuring apparatus comprising:
   a first conduit adapted to convey a flowing fluid of variable heat content;
   a constriction within said first conduit across which a differential pressure develops proportional to fluid flow rate;
   a by-pass tube connecting high and low pressure portions of the said first conduit so that some of the aforementioned fluid flows through the said by-pass at a rate proportional to the differential pressure;
   a heat shunt member having first and second ends and a relatively high thermal conductivity;
   a heat exchanger for transferring heat between fluid within the said by-pass and the first end of the said heat shunt, the said heat and heat shunt being otherwise thermally isolated from the fluid within said first conduit;
   a second conduit adapted to convey a flowing fluid used to establish a reference temperature;
   a heat sink thermally coupled to the second end of the said heat shunt and to the fluid within the said second conduit, said heat sink thereby being maintained at the aforementioned reference temperature;
   means for measuring the temperature differential across the said heat shunt, said measuring means providing a corresponding electrical output signal; and,
   means for indicating the said electrical output signal as a measure of the heat flow through the said first conduit.

7. Apparatus as described in claim 6, wherein said first conduit is adapted to convey heated water away from a water-heating system;
   said second conduit is adapted to convey water from a water supply toward the aforementioned water-heating system; and
   said indicating means includes an electrical signal integrator for indicating the totalized heat flow through the said first conduit relative to the water temperature in the said second conduit.

8. Apparatus as described in claim 6, wherein said first conduit is adapted to convey cool water away from a water-cooling system; said second conduit is adapted to convey water from a water supply toward the aforementioned water cooling system; and,
   said indicating means includes an electrical signal integrator for indicating the totalized heat flow through the said first conduit relative to the water temperature in the said second conduit.

9. Apparatus as described in claim 7, wherein the said electrical signal integrator comprises an electrochemical coulometer for indicating the totalized heat flow through the said first conduit relative to the water temperature in the said second conduit.

10. A method for measuring the heat conveyed by a flowing fluid comprising;

passing a flowing fluid of variable heat content through a conduit having a constriction across which a defferential pressure develops proportional to flow rate;

connecting high and low pressure portions of the said conduit so that some of the fluid is by-passed at a rate proportional to the differential pressure; transferring heat from the said by-passed fluid to a first endof an elongated and highly conductive heat shunt, said heat shunt being otherwise thermally isolated from the fluid within the said conduit;

maintaining a second end of the said heat shunt at a reference temperature by means of a heat sink;

measuring the temperature differential along a portion of the said heat shunt; and, indicating the quantity of heat flow within the said conduit as a function of the said measured temperature differential.

* * * * *